United States Patent [19]

Mabru

[11] 3,896,201

[45] July 22, 1975

[54] METHOD OF PROCESSING RAW MATERIALS FOR THE MANUFACTURE OF GLASS

[75] Inventor: Marcel Mabru, Paris, France

[73] Assignee: Saint-Gobain Industries, France

[22] Filed: Aug. 14, 1972

[21] Appl. No.: 280,324

[30] Foreign Application Priority Data
Aug. 24, 1971 France .................... 71.30696

[52] U.S. Cl. .................... 264/118; 264/140
[51] Int. Cl. .................... B01j 2/22
[58] Field of Search .................... 264/118, 117, 140

[56] References Cited
UNITED STATES PATENTS

| | | | |
|---|---|---|---|
| 2,933,766 | 4/1960 | Bickford et al. | 264/140 |
| 3,309,444 | 3/1967 | Schueler | 264/122 |
| 3,471,603 | 10/1969 | Patrick | 264/118 |
| 3,486,189 | 12/1969 | Lau et al. | 264/140 |
| 3,726,697 | 4/1973 | Mod et al. | 264/117 |
| 3,758,655 | 9/1973 | Wienand | 264/118 |

Primary Examiner—Robert F. White
Assistant Examiner—J. R. Hall
Attorney, Agent, or Firm—Pennie & Edmonds

[57] ABSTRACT

A method of processing the raw materials of glass for fusion which comprises depositing upon a belt conveyor the mixed and moistened raw materials in particles of the usual sizes used in glass fusion, pressing the moist raw materials into a ribbon of approximately uniform thickness capable of breaking under its own weight when unsupported, and transporting the fragments of the ribbon formed at the end of the conveyor through a hot, drying atmosphere.

7 Claims, 2 Drawing Figures

PATENTED JUL 22 1975    3,896,201
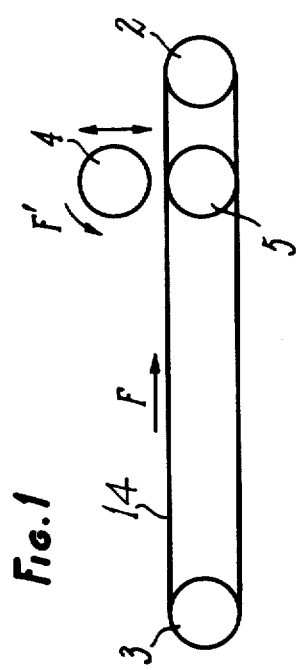
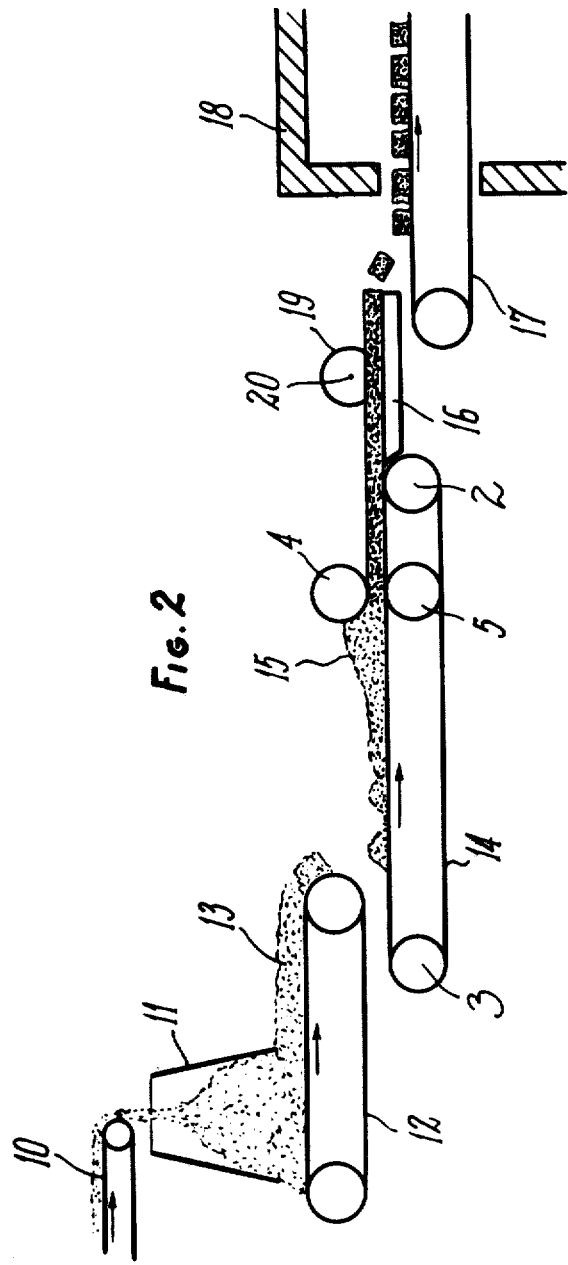

METHOD OF PROCESSING RAW MATERIALS FOR THE MANUFACTURE OF GLASS

This invention relates to the manufacture of glass and to the preparation of the raw materials for fusion. The invention comprehends a process for producing the product by the process.

It is usual to introduce the raw materials from which glass is made by fusion, frequently called the charge, into the furnace as a powder composed of grains of sizes below about 2 mm., but that operation entrains a number of disadvantages among which are:

A risk of segregation among the different constituents, either during storage in the silo or on the screens under the force of gravity, or on the belt conveyors under the influence of vibrations;

The floating off of the finest particles of the charge on the air currents in the furnace itself and in the chambers of the regenerator, with all the consequences on the quality of the glass and on the life span of the furnace domes and the chambers of regeneration;

The difficulty of heating a powder charge satisfactorily inside a furnace because of the bad transference of heat by conduction and also because of the fact that premature fusion of the lower melting components of the charge induces an additional type of segregation.

A number of proposals have been made to correct these defects, for instance by agglomerating the charge or by compressing it into balls, grains, and plates. However, such processes have seriously objectionable features, among which are the requirements that the components of the charge must be very fine to be compacted by such procedures, which requires the introduction of costly preliminary operations of breaking and screening, and that the use of substantial mechanical forces including high use of power causes the rapid wear of machinery. Such methods have been expensive.

It is an object of this invention to compact the charge for glassmaking without changing the sizes of the granules customarily used in the charge, which range from near zero to about 2 mm.; to produce the charge in vitrifiable chunks of sizes readily and uniformly vitrifiable; to maintain substantial uniformity of composition of the chunks by preventing the segregation of different sizes and materials and the escape of light components on currents of gases; to accomplish these things at low cost, with simple apparatus which is easy to install, economic in operation, consumes little power, and of which the rate of wear is negligible.

The objects are accomplished, generally speaking, by a method of processing the raw materials of glass for fusion which comprises depositing upon a conveyor the mixed and moistened raw materials in particles of the sizes customarily used in glass fusion, pressing the moist, mixed raw materials into a layer of substantially uniform thickness, subdividing the layer into small chunks, and drying the chunks; and by an apparatus for forming the mixed and moistened raw materials used in glassmaking into briquettes which comprises upstream conveyor means, means to load the conveyor means with a moist mixture of raw materials, means to compress the moist mixture on the conveyor means into a layer of insufficient strength to be self-sustaining, means to subdivide the layer, and means to dry the subdivisions.

In achieving the objects of the invention the powdered, vitrifiable charge is mixed, humidified, rolled out as a layer of approximately uniform thickness between a belt conveyor and a pressure roller, broken into chunks of approximately uniform sizes, and dried.

The apparatus for carrying out the process includes an endless belt conveyor of which the upper course is substantially horizontal and passes over a roller of which the axis is approximately horizontal which supports the upper course and is entrained by it, which includes a second roller which is parallel to the first which is placed a short distance above the upper course of the conveyor and above the first roller.

The vitrifiable charge, humidified, is distributed across the width of the conveyor and carried toward the narrow space between the conveyor and the lower generatrix of the upper roller. The upper roller is driven with a tangential speed close to that of the conveyor belt. The charge is thus compressed and formed into a layer between the conveyor and the upper roller which is of approximately uniform thickness and which is similarly hardened by drying. Prior to the drying it is advantageous to break the compressed layer up into chunks of efficient sizes.

The above and further objects and novel features of the present invention will more fully appear from the following detailed description when the same is read in connection with the accompanying drawing. It is to be expressly understood, however, that the drawing is for the purpose of illustration only and is not intended as a definition of the limits of the invention.

In the drawing, wherein like reference characters refer to like parts throughout the several views, FIG. 1 is a schematic representation of the portion of the apparatus shown in FIG. 2; said portion of the apparatus forms the compressed layer of moistened charge.

FIG. 2 is a diagrammatic representation of the apparatus which is employed to accomplish the novel process.

Referring to FIG. 1 the conveyor belt 14 passes over and extends between rollers 2 and 3, the upper course moving in the direction of arrow F. Near the downstream end of the course is a pressure roller 4 which is rotated in the direction of arrow F'. This pressure roller is adjustable in height above the conveyor.

Just below the pressure roller 4 the upper course of the belt is supported by a roller 5 which prevents the belt from sagging under the action of roller 4 and provides for the production of a layer of charge of substantially uniform thickness. The conveyor and the pressure roller 4 are individually driven by a variable motor which permits the individual adjustment of their peripheral speeds, which should be very close or probably equal. Such controlling apparatus is well known and is not illustrated.

FIG. 2 is a diagramatic illustration of the apparatus for carrying out the process of the invention. The powdery charge homogeneously mixed, and wetted in mixers of known construction and of types commonly used in glass technology is carried on a conveyor 10 and dumped into a reserve hopper 11 of truncated pyramidal form situated above another belt conveyor 12 of which the upper course moves in the direction of the arrow and moves a layer 13 of wetted charge downstream. The right-hand end of the conveyor belt 12 overlies conveyor 14. The humidified layer 13 falls onto the upper course of belt conveyor 14, is carried up against pressure roller 4, is formed into a layer between rollers 4 and 5, passes beyond the end of belt conveyor 14 onto a flat support 16, being pushed over it by the belt and the rollers 4, 5, and breaking off and falling in chunks onto the upstream end of a conveyor belt 17 which carries the chunks into a drying furnace 18.

The humidified powdery charge 13 falls in lumps from the conveyor 12 onto conveyor 14 and is carried toward the pressure roller 4 at a speed substantially superior to that of the conveyor 12, for example the speed of the belt 14 may be eight times that of belt 12. On the other hand the thickness of the powdery material on belt 14 is much less than that on belt 12, for example a ratio of about 1 to 10. Upstream of the pressure roller 4 the powdery charge builds up into a mass 15 which assures that the space between the rollers is constantly supplied. This agglomeration 15 also insures a rapid distribution of the charge across the whole width of the belt. The powdery charge is carried by the belt 14 between rollers 4 and 5 where it is strongly compressed and formed into a layer, so that there is produced downstream of this pair of rollers a ribbon or layer of compressed, powdery charge which is continuous and homogeneous. At the end of the conveyor belt 14 this layer is supported by a fixed shelf 16 at the end of which the layer breaks transversely under the effect of its own weight, that is to say under the force of gravity, and falls in the shape of bars on the conveyor belt 17 which transports them into the drying oven 18.

The apparatus also includes side guides, not shown, which extend longitudinally alongside the belt to keep the powdery charge on the belt. Such guides are known and are adjustable in position.

The compressed composition can be introduced into the drier as the continuous ribbon shown downstream of rollers 4 and 5 but it is better to break it up before it enters the drier. Transverse breakage is shown in FIG. 2 as the bars break off and fall from the end of the advancing layer onto the conveyor belt 17 and the compressed layer may be incised longitudinally by cutters such as 19 which may be a series of free running disks mounted upon an axle 20. This axle may be conveniently placed in such a position that the disks only penetrate half-way through or two-thirds of the way through the layer, in which case the longitudinal sections which break off from the end of the layer are broken into smaller chunks when they strike the conveyor belt 17.

In order to secure regular functioning of the apparatus it is advantageous to prevent the wetted, powdery, mass from attaching itself to the pressure roller 4, and to this end is it desirable that that roller shall be perfectly smooth. Furthermore, in order that the charge which is to be compressed and agglomerated shall be regularly carried between the rollers 4 and 5 the conveyor 14 should have a substantially elevated coefficient of friction. This has led to a construction which produces excellent results in which the belt 14 may be of rubber, possibly striated but striation is not necessary. On the other hand, pressure roller 4 has a perfectly smooth surface with a low coefficient of friction with respect to the charge. Tests by the inventor have shown that a polished steel roller does not give excellent results because the humid, powdery charge attaches itself to the surface of the roller and requires the use of cleaning apparatus such as scrappers or brushes of which the action is never perfect and in any case complicates the apparatus.

It is preferable to use a pressure roller provided with a smooth revetment of hard rubber or of plastic. Several different kinds of plastic are satisfactory, for instance polyvinyl chloride and polyethylene, but it has been discovered that superiority of results are obtained by the use of polytetrafluoroethylene, which has excellent characteristics of hardness, cohesion, tenacity, and shaping, combined with perfect resistance to the chemical agents present in certain charges, for example caustic soda. The Shore hardness of the belt 14 should preferably be at least 60 and the belt conveyors of commerce which have a Shore hardness of 70 give excellent results.

As we have indicated hereinabove it is not necessary in preparing the vitrifiable charge for rolling out according to the present invention to change the usual technique for preparing the charge. In particular the granulometry of the different constituents of the charge may be as they have in the past, which constitutes an important advantage with respect to prior processes which involve compression but requiring granulation in a bowl, in a rotating cylinder, or by other means which are expensive in time, labor and machinery. The charge to be rolled out may be humidified as in any prior manner, it being noted that the content of water is not critical; the optimal values vary between 5 and 16% according to the composition of the raw materials, 9–10% of water frequently giving the best results.

The nature and the composition of the vitrifiable, powdery charges which can be successfully handled by the present process vary widely, thus, outside of mixtures containing constituents well known to have properties valuable to chemical resistance and to possess hardening tendencies (e.g. caustic soda in the presence of alkaline earth carbonates, silicates, and sodium carbonate), it has been possible to agglomerate humidified mixtures of powdery constituents of glassmaking among which those which are known to promote cohesion are not present. The following examples are given of vitrifiable charges which have been satisfactorily used in the present process, but these examples represent good practice and do not imply limitations on the generality elsewhere herein expressed:

A charge of the usual type employed for the manufacture of window glass, see Tooley "Handbook of Glass Manufacture," received an addition of 9% by weight of moisture and was handled as in FIG. 2 with satisfactory results. The chunks issuing from the drier could be mechanically handled by ordinary loading apparatus without disintegrating;

A typical charge for making window glass in which 60% of the $Na_2O$ was introduced as a 50% solution of lye was wetted with 9% of water and made a satisfactory charge under the conditions stated in the prior paragraph;

Optical glass raw materials, for the production of extra white crown, were satisfactorily processed with an addition of 16% moisture, following the method and apparatus of FIG. 2;

The raw materials of a special glass containing 50% PbO received 6% moisture and was satisfactorily processed in similar apparatus;

The raw materials for the borosilicate glass known as "Pyrex" was satisfactorily processed with an addition of 9% of water.

The exact composition of these different charges has not been given because, by reference to the great differences between these compositions, it is seen that the invention is applicable to vitrifiable compositions of the most varied types.

Whatever may be the compositions of the vitrifiable charge the layering is always easy but the chemical resistance of the layers produced after drying may vary widely according to the composition. This chemical resistance is, in substantially all ordinary cases, sufficient to withstand storage and the handling necessary in feeding the furnace.

The pressure roller 4 and the belt conveyor 14 are driven at surface speeds which are substantially identical. This is not imperative and they may occasionally be given surface speeds which are somewhat different. In the case of the preferred manner of operation as described hereinabove, combining the use of a belt conveyor covered with rubber and a pressure roller covered with Teflon, it has been established that (a) if the peripheral speeds of the compression members are equal, the speed of the compressed layer is slightly higher; (b) if the speed of the pressure roller is less than that of the belt, the compressed layer will have the same speed as the belt; (c) if the speed of the pressure roller is higher than that of the belt, the compressed layer has a speed superior to that of the belt, and may even become upon occasion higher than that of the pressure roller. In general practice it is satisfactory to use modes (a) or (c) in which the peripheral speed of the pressure roller 4 is superior or equal to the surface speed of the belt 14. The thickness of the compressed layer may vary very widely. These variations in thickness are obtained very simply by adjusting the distance of the axis of the pressure roller toward or away from the plane of the belt. To this end the roller is mounted for vertical adjustment, while the axis of the roller which supports the belt is in a fixed position. The thickness to be given to the compressed layer and its fragments is chosen as a function of the capacity of the drying apparatus and its use. This thickness has a minor limit that it should not be less than twice the largest dimension of the grains of the composition. The applicant has worked successfully with thicknesses from 5 to 12 mm. It will be understood that the apparent density of the compressed layer decreases as the thickness of the layer increases.

The mechanical resistance of the compressed product, before drying, varies according to several factors, for example the thickness of the layer; the mechanical strength of the layer is always low, which permits its spontaneous fragmentation under the effect of its own weight as it passes beyond the end of the slide 16. For example, a compressed layer 10 mm. thick produced barrettes about 3 cm. wide while a layer 12 mm. thick furnished barrettes with a width of about 5 mm.

The mechanical resistance to bending, of the product of this invention, has been tested after compressing and drying a classical composition for window glass in which 60% of $Na_2O$ was introduced as 50% lye (solution of caustic soda). The platelets had dimensions of 80 × 40 × 10 mm. The bending values determined were on the order of 150 to 180 $g./mm.^2$.

The chemical stability and adsorption of humidity of the platelets in storage are satisfactory. In particular platelets stored loose, in bulk, had no tendency to fragmentation or to run together.

The width of the vitrifiable layer can be varied within large limits and may even be wider than 1 meter. Thus in an apparatus constructed by the applicant for this operation the compression roller was 20 cm. in diameter and 1.3 m. long. With such apparatus vitrifiable charges were compressed to thicknesses between 4 and 12 mm. and the width of the compressed charge was made to vary between 0.4 and 1 m. The machine was operated at speeds between 2 and 6 m./min. That apparatus was capable of supplying a melting furnace having a capacity of 150 tons per day. It was easily driven by an electric motor of 1.5 CV. This performance is far superior to that produced by other types of apparatus. For example, an apparatus employing compression through a die (filere de granulation) having a capacity of only 30 tons per day required a power of about 35 CV; and the manufacture of vitrifiable bullets at a rate of 350 tons per day required about 100 CV. These figures show the great advantages which the invention has in reducing the consumption of energy and, as a consequence, the cost of the glass.

It is well known that the mixed charges used in making glass are highly abrasive and cause a rapid wear of machinery heretofore used for preparing charges in the form of lumps, but a particular advantage of the present invention is that over a period of 10 days constant use there was no sign of wear either on the belt or on the compression roller.

The drying oven 18 is preferably constructed and operated so that drying will occur progressively and not so briskly as to harden the surface into a crust, which would make drying of the interior of the lumps difficult. A satisfactory oven may conveniently raise the temperature gradually along its length until it attains a temperature of about 400°C., it being understood that the rate at which the temperature increases can be varied to suit particular conditions.

As many apparently widely different embodiments of the present invention may be made without departing from the spirit and scope thereof, it is to be understood that the invention is not limited to the specific embodiments.

What is claimed is:

1. A method of processing vitrifiable powdery raw materials for the manufacture of glass by fusion which comprises:
    a. mixing and moistening with water the raw materials,
    b. depositing and supporting the mixed and moistened raw materials on a moving support,
    c. pressing the mixed and moistened raw materials while on said support into a ribbon of approximately uniform thickness to a degree that the ribbon will break under its own weight when unsupported,
    d. transporting the ribbon off of said support to an unsupported condition to cause the ribbon to break into fragments under its own weight, and
    e. drying the resultant fragments for subsequent use in a fusion furnace for the manufacture of glass.

2. A method of processing vitrifiable powdery raw materials for the manufacture of glass which comprises:
    a. mixing and moistening with water the raw materials,
    b. depositing and supporting the mixed and moistened raw materials on a moving support, c. pressing the mixed and moistened raw materials while on said support into a ribbon of substantially uniform thickness,
d. transporting and subdividing the ribbon off of said support to an unsupported condition to cause the ribbon to break into fragments and
e. drying the resultant fragments for subsequent use in a fusion furnace for the manufacture of glass.

3. A method according to claim 2 in which the subdivision comprises the steps of incising the ribbon through less than its thickness and separating the incised parts.

4. A method according to claim 2 in which the moisture content of the mixed raw materials is between about 5 and about 16%, and compressed from a shapeless mass to a thickness between about 4 to 12 mm to form a ribbon capable of breaking under its own weight when unsupported, and projecting the ribbon beyond the support to allow the ribbon to be subdivided under the influence of gravity.

5. A method according to claim 4 in which the subdivisions are deposited upon a second moving support, and are conveyed through a drying oven of progressively increasing temperature from ambient temperature to about 400°C.

6. A method according to claim 2 in which the pressing of the mixed and moistened raw materials comprises passing the raw material between a pressure roller and the support and wherein the peripheral speed of the pressure roller is substantially identical to the speed of the moving support.

7. A method according to claim 2 in which the pressing of the mixed and moistened raw materials comprises passing the raw material between a pressure roller and the support and wherein the peripheral speed of the pressure roller is superior to the speed of the moving support.

* * * * *